(12) United States Patent
Aoki et al.

(10) Patent No.: US 6,918,835 B2
(45) Date of Patent: Jul. 19, 2005

(54) POWER TRANSMISSION SYSTEM

(75) Inventors: Yuuichi Aoki, Chita-gun (JP); Yasuo Tabuchi, Toyoake (JP)

(73) Assignee: Denso Corporation, Kariya (JP)

( * ) Notice: Subject to any disclaimer, the term of this patent is extended or adjusted under 35 U.S.C. 154(b) by 131 days.

(21) Appl. No.: 10/656,329

(22) Filed: Sep. 8, 2003

(65) Prior Publication Data

US 2004/0063503 A1 Apr. 1, 2004

(30) Foreign Application Priority Data

Sep. 27, 2002 (JP) ........................................ 2002-283137

(51) Int. Cl.[7] ................................................ F16D 9/00
(52) U.S. Cl. .............................. 464/32; 464/76; 464/83
(58) Field of Search ............................. 464/32, 76, 74, 464/85, 83; 417/319; 297/344.21, 344.23, 344.25, 344.26, 353, 354.1, 354.13, 362.11, 217.1, 217.3; 248/425, 131, 415; 5/656

(56) References Cited

U.S. PATENT DOCUMENTS

| | | | | |
|---|---|---|---|---|
| 4,859,156 A | * | 8/1989 | Kikuchi | 417/319 |
| 6,705,181 B2 | * | 3/2004 | Tabuchi et al. | 464/76 |
| 6,722,993 B2 | * | 4/2004 | Tabuchi et al. | 464/34 |
| 2002/0132673 A1 | | 9/2002 | Tabuchi et al. | |
| 2002/0198056 A1 | * | 12/2002 | Tabuchi et al. | 464/32 |

* cited by examiner

Primary Examiner—Gregory J. Binda
Assistant Examiner—Aaron Dunwoody
(74) Attorney, Agent, or Firm—Posz & Bethards, PLC

(57) ABSTRACT

Two-step protruding portions are provided in a cover of a pulley for hooking the cover on the pulley. When a bridging part is broken, a driving-unit-side portion of the bridging part is outwardly displaced in a rotation axis direction of the pulley. The first-step protruding portion of the cover thereby slips out from a hooking state. However, after the driving-unit-side portion mounts on the driven-unit-side portion, no further force acts outwardly in the rotation axis direction. As a result, the second-step protruding portion of the cover is hooked on the pulley, so that the cover can be fixed to the pulley. This results in inhibiting broken bridging parts or dampers from dispersing.

4 Claims, 7 Drawing Sheets

FIG. 8A
PRIOR ART
FIG. 8B
PRIOR ART
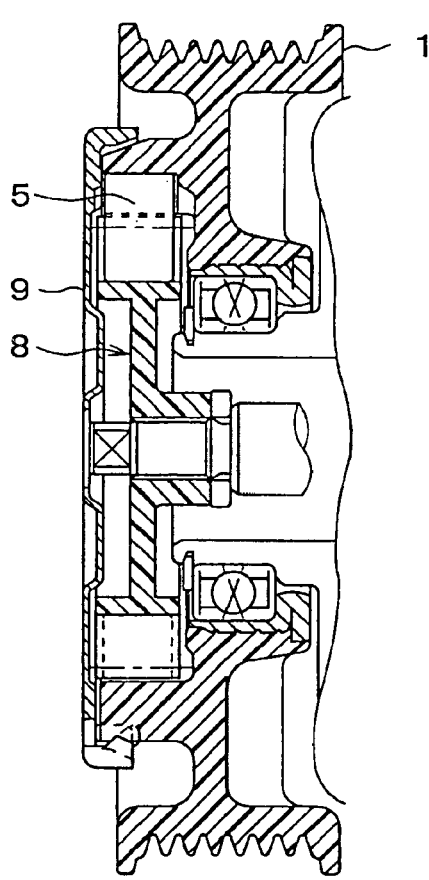
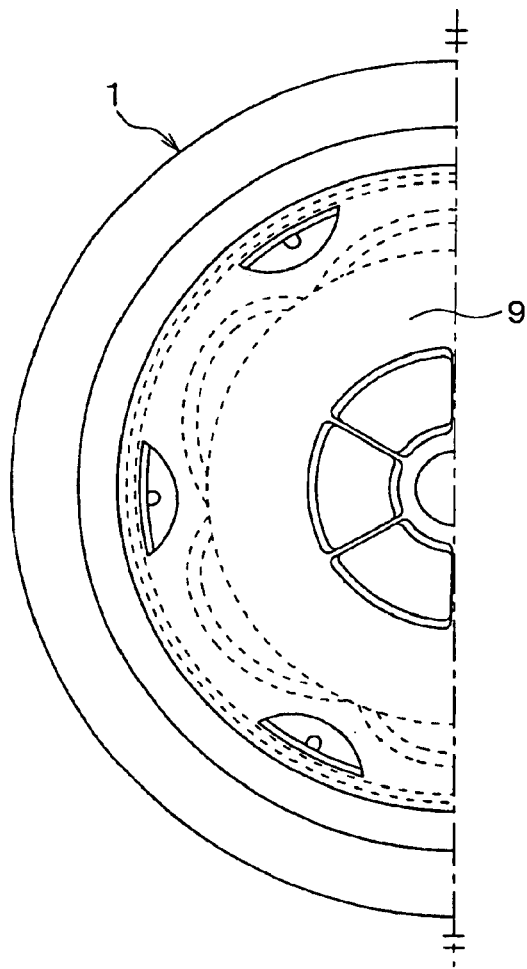

POWER TRANSMISSION SYSTEM

CROSS REFERENCE TO RELATED APPLICATIONS

Applicants disclosed in U.S. Pat. No. 6,722,993 a power transmission system. The system includes a damper for absorbing torque fluctuation and a torque limiter that interrupts torque transmission by breaking transmission passage when transmission torque exceeds a given torque.

FIELD OF THE INVENTION

The present invention relates to a power transmission system that transmits torque generated by a driving unit such as an engine and an electric motor to a driven unit such as a pump and a compressor. The present invention is suitably applied to a power transmission system transmitting a power from an engine to a compressor used for an air conditioning apparatus for a vehicle.

BACKGROUND OF THE INVENTION

Applicants disclosed in U.S. patent application publication (2002/0132673 A1) a power transmission system. The system includes a damper for absorbing torque fluctuation and a torque limiter that interrupts torque transmission by breaking transmission passage when transmission torque exceeds a given torque.

However, examination of a prototype of the above system exhibits a problem. Namely, of the system the power transmission, i.e., a pulley 1, is equipped with a cover 9 as shown in FIGS. 8A, 8B. The cover 9 is hooked to be fixed with the pulley 1 for inhibiting the damper 5 from departing due to its deformation. When transmission torque exceeds a given torque and the torque limiter 8 is thereby broken, the cover 9 slips out from the pulley 1 and a fragment of the broken torque limiter 8 or the damper 5 is outwardly dispersed. After investigating the causes of the preceding, the following are found.

As the torque limiter 8 is broken, a driving-unit-side portion 8A of the torque limiter 8 continues to be rotated while the other driven-unit-side portion 8B stops. Both the portions 8A, 8B thereby collide with each other, and the driving-unit-side portion 8A mounts on the driven-unit-side portion 8B to be outwardly displaced in the rotation axial direction, as shown in FIG. 9. Pushing force due to the displacement causes the cover 9 to slip out from the pulley 1.

To deal with the problem, it is likely that a clearance is previously provided between the cover and pulley as meeting the maximum displacement, i.e., equivalent to thickness of the torque limiter. However, providing excessive clearance lessens effectiveness in an original function that restricts deformation of the damper. Furthermore, providing the additional clearance results in reducing clearance with other devices. This may generate interference between the cover and other devices.

SUMMARY OF THE INVENTION

It is an object of the present invention to provide a power transmission system that restricts slipping out of a cover and dispersing of a broken fragment of a torque limiter or a damper when a torque limiter is broken.

To achieve the above object, a power transmission system is provided with the following. A first rotating member is rotated by a driving unit. A second rotating member is connected to a driven unit. A torque limiter transmits torque from the first rotating member to the second rotating member. The torque limiter is partially broken to interrupt transmitting the torque when the torque transmitted to the driven unit exceeds a predetermined value. A damper formed of an elastically deformable member is disposed between the first and the second rotating members. A cover is hooked to be fixed with at least one of the first and the second rotating members to inhibit the damper from being outwardly displaced in a rotation axis direction. The cover includes a first-step protruding portion and a second-step protruding portion. By using the first-step protruding portion the cover is hooked in a first state, while by using the second-step protruding portion the cover is hooked in a second state. A clearance between the cover and the damper in the first state is narrower than a clearance in the second state.

This structure leads to the following. Once a broken torque limiter is outwardly displaced in the rotation axis direction, the first-step protruding portion slips out from a hooking state. However, thereafter, no further pushing force acts outwardly in the rotation axis direction. The cover is thereby hooked and fixed by virtue of the second-step protruding portion.

Consequently, without previously providing an additional clearance between the cover and the damper, the cover is inhibited from slipping out when the torque limiter is broken. In other words, without making narrower a clearance between the cover and other devices, the cover restricts displacement of the damper along with dispersion of the broken torque limiter, the damper, or the like.

BRIEF DESCRIPTION OF THE DRAWINGS

The above and other objects, features, and advantages of the present invention will become more apparent from the following detailed description made with reference to the accompanying drawings. In the drawings:

FIG. 8A is a sectional view of a prior art power transmission system;

FIG. 8B is a left-side view of FIG. 8A;

DETAILED DESCRIPTION OF THE PREFERRED EMBODIMENTS (First Embodiment)

Structure of a power transmission system in a first embodiment of the present invention will be now described with reference to FIGS. 1 to 4.

Figure 1:
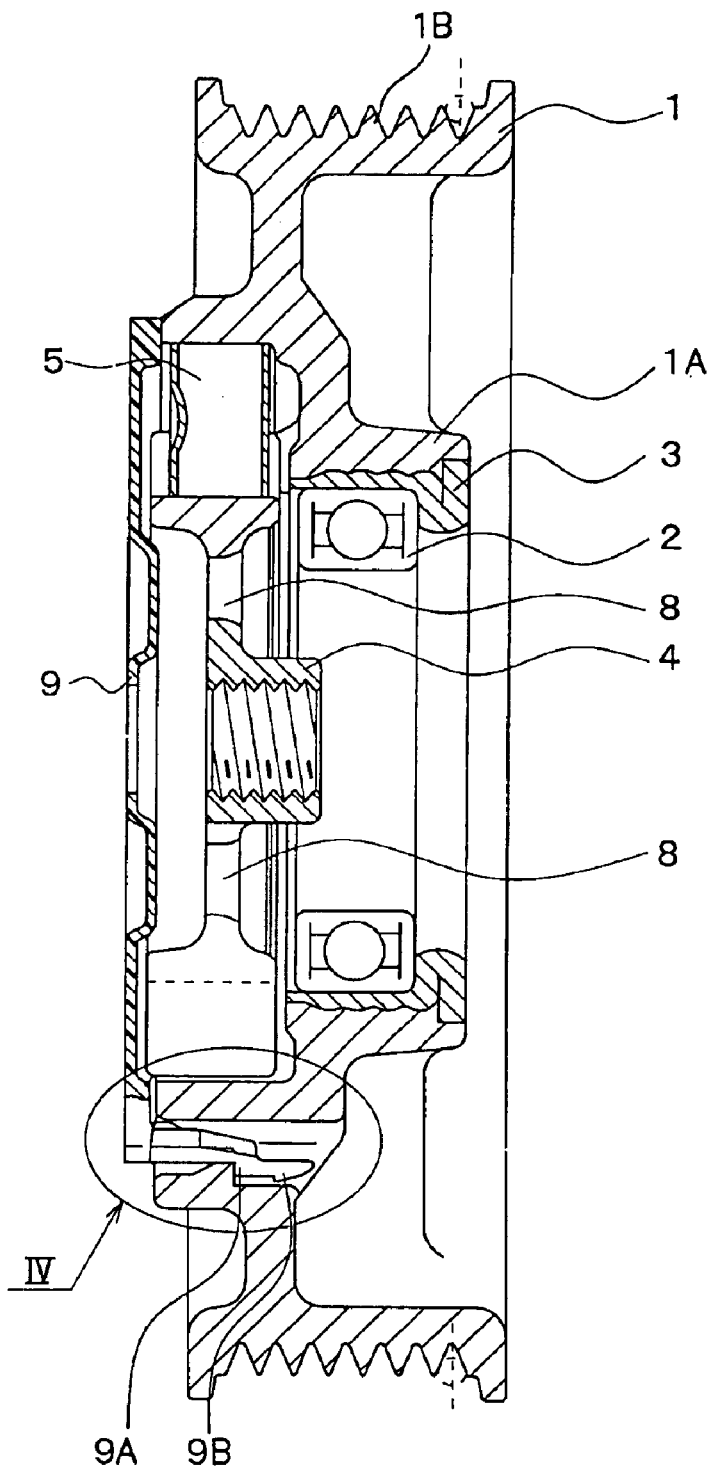
FIG. 1 is a sectional view of a power transmission system according to a first embodiment of the present invention, and taken along the line I—I in FIG. 2.

Referring to FIG. 1, a pulley 1 is used as a first rotating member. The pulley 1 is made of metal or hard resin (e.g., phenol resin in this embodiment), and is formed into an approximately cylindrical shape to be rotated by a power from an engine through a V-belt (not illustrated).

The power from the engine is transmitted to the pulley 1 through the V-belt. Inside the pulley 1, a cylindrical pulley hub 1A is formed integrally with the pulley 1 by molding. A radial-rolling bearing 2 is attached to the pulley hub 1A to rotatably support the pulley 1. An inner part of the radial-rolling bearing 2 is press-fitted to a front housing of a compressor (not illustrated).

In the first embodiment, the pulley 1 made of resin has a plurality of V-shaped grooves 1B for a V-ribbed belt. A metal sleeve 3, to which the bearing 2 is attached, is integrated with the pulley hub 1A at an inner radial wall of the pulley hub 1A by insert molding.

Figure 3:
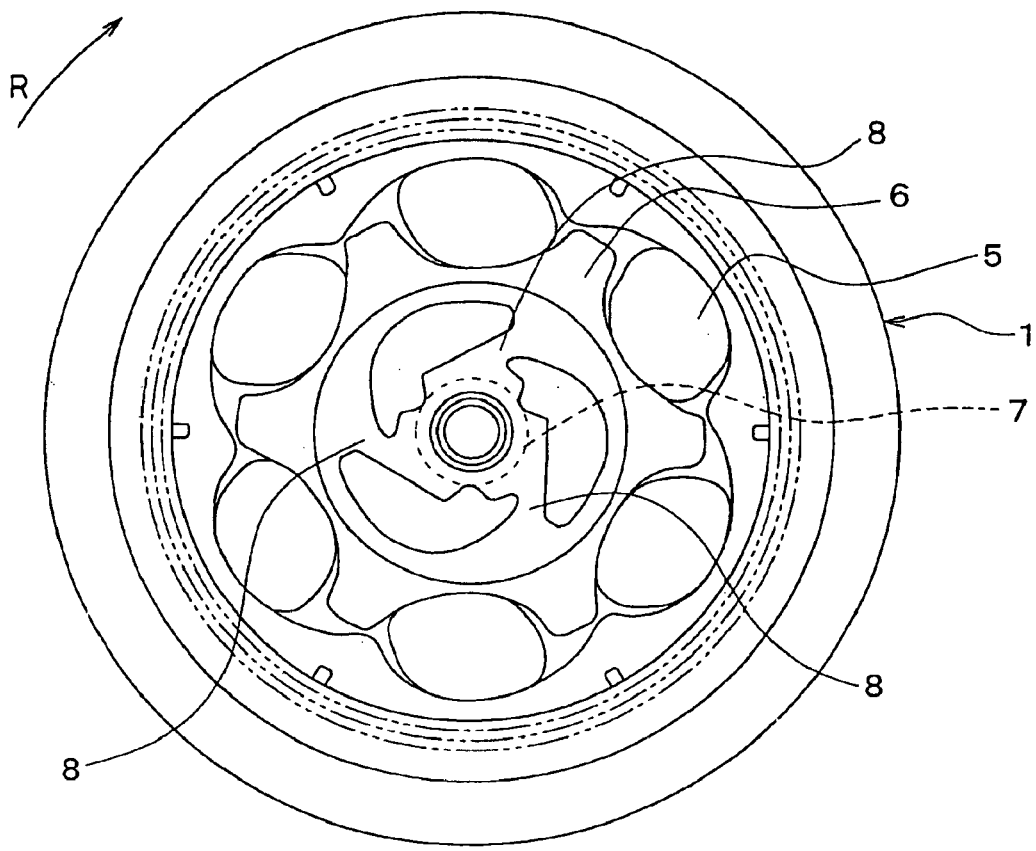
FIG. 3 is a front view of a center hub according to the first embodiment.

A center hub 4 made of metal is coaxially disposed inside the pulley 1, as shown in FIG. 1. As shown in FIG. 3, the center hub 4 is formed as having a hexagonal shape such as a star or a toothed wheel, in which each side is warped inward.

The center hub 4 includes an outer hub 6, plural bridging parts 8, and a cylinder part 7, all of which are integrally formed by sintering metal powder.

The outer hub 6 is disposed as contacting with dampers 5 that are disposed in an outer periphery of the center hub 4. The cylinder part 7 is used as a second rotating member in the power transmission system and connected to a shaft (not illustrated) of the compressor by spline coupling.

The bridging parts 8 are disposed to transmit torque from the outer hub 6 to the cylinder part 7 by mechanically connecting the outer hub 6 and the cylinder part 7. Each bridging part 7 is formed as a torque limiter that is designed to be broken when the torque transmitted from the outer hub 6 to the cylinder part 7 exceeds a predetermined threshold value. In the first embodiment, three bridging parts 8 are provided, for example.

The dampers 5 formed of an elastic material are disposed between a concave-convex portion of the center hub 4 and a concave-convex portion of the inner surface of the pulley 1 as transmitting torque from the pulley 1 to the center hub 4.

The damper 5 is made of two types of the elastic material. The second type of the two types is capable of further inhibiting oxygen from penetrating than the first type, so as to act as an oxygen-inhibiting layer. In this embodiment, acrylic rubber is used as the second type, while EPDM (ethylene-propylene-diene ternary polymerization rubber) is used as the first type. The second type, the oxygen-inhibiting layer, is applied to a certain portion of an outer surface of the damper 5, the certain portion where the damper 5 does not contact with the pulley 1 or the center hub 4. The first type is applied to an inward region from the oxygen-inhibiting layer, and to a given portion of the outer surface where the damper 5 contacts with the pulley 1 or the center hub 4.

As shown in FIG. 1, a plastic cover 9 is hooked on the pulley 1 as being close to the damper 5 at one end side in the axial direction (the left end in FIG. 1) of the pulley 1. The damper 5 is thereby prevented from moving toward the one end side in the axial direction more than a predetermined dimension.

Figure 4:
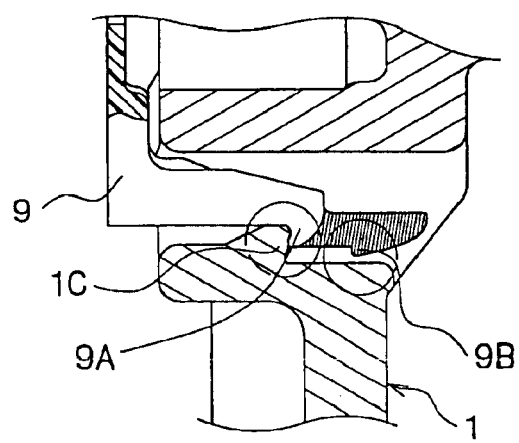
FIG. 4 is an enlarged sectional view of the region IV in FIG. 1.

In detail, the cover 9 has two-step protruding portions, which are elastically deformable, for hooking the cover 9 with having a clearance from the damper 5. As shown in FIG. 4, when a first-step protruding portion 9A is hooked on a stepping portion 1C of the pulley 1 for hooking, the cover is disposed with a given clearance from the damper 5. By contrast, when a second-step protruding portion 9B of the cover 9 is hooked on the stepping portion 1C, the cover 9 is disposed with a broader clearance than the given clearance that is provided by using the first-step protruding portion 9A. The first-step and second-step protruding portions 9A, 9B and the cover 9 are integrally molded by using resin.

By contrast, the damper 5 is prevented from moving toward the other end side in the axial direction (the right end in FIG. 1) by the pulley 1 itself.

Next, operation and operational effects of the power transmission system according to this embodiment will be described. When a torque is applied to the pulley 1, the pulley 1 and the center hub 4 are relatively displaced from each other. The damper 5 is thereby shearing-deformed while being compression-deformed. That is, the damper 5 is deformed to have the shearing deformation and the compression deformation. Accordingly, the torque is transmitted from the pulley 1 to the center hub 4 by the reaction force due to a vector component of the deformation of the damper 5, in parallel to the pulley rotation direction. Here, the torque fluctuation is reduced by the shearing deformation and the compression deformation of the damper 5.

If the torque transmitted from the pulley 1 to the center hub 4 exceeds a predetermined value, the bridging part 8 is broken and divided into a driving-unit-side portion 8A and a driven-unit-side portion 8B. The torque transmission from the pulley 1 to the center hub 4 is thereby interrupted.

Figure 5:
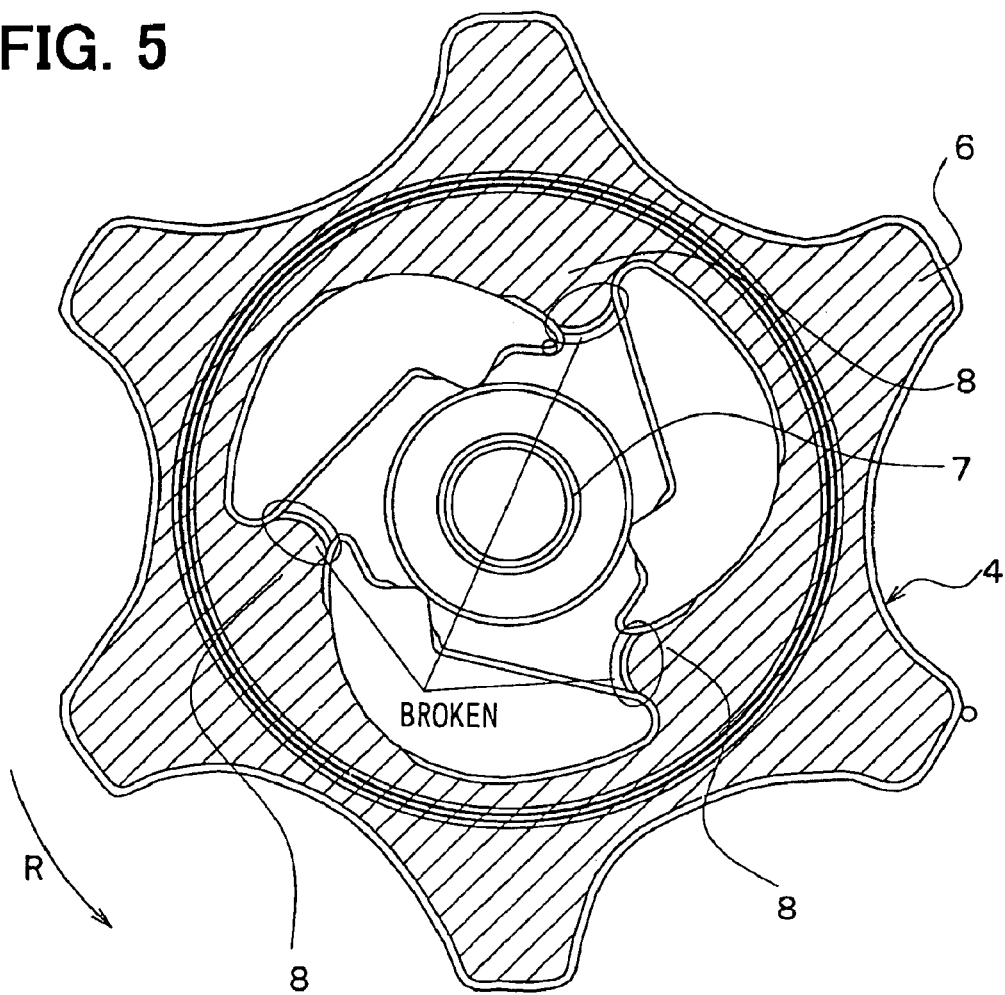
FIG. 5 is a schematic view explaining operation of the pulley according to the first embodiment.
Figure 6:
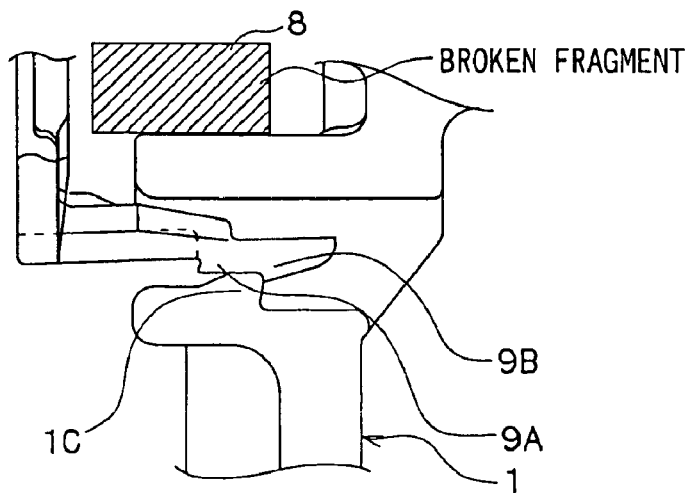
FIG. 6 is a schematic view explaining operation of the pulley according to the first embodiment.
Figure 9:
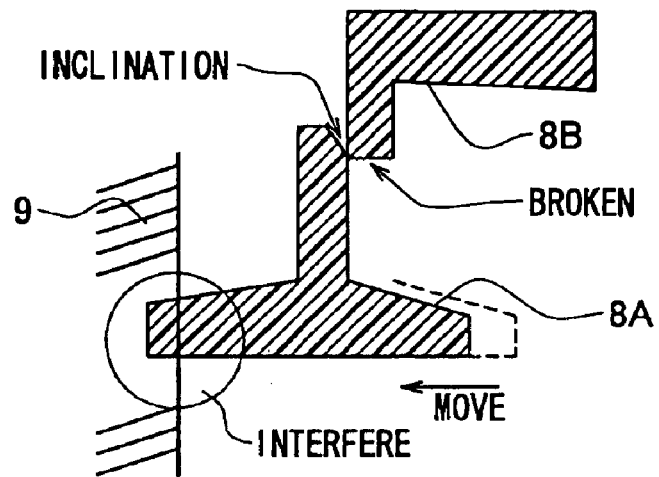
FIG. 9 is a schematic diagram explaining a problem associated with a prior art power transmission system.

Here, the driving-unit-side portion (fragment) 8A, i.e., outer-hub-side portion (shaded area in FIG. 5), is rotated by the pulley 1. By contrast, the driven-unit-side portion (fragment) 8B, i.e., cylinder-part-side portion (not shaded in FIG. 5) stops. The driving-unit-side and driven-unit-side portions 8A, 8B thereby collide with each other. As a result, the driving-unit-side portion 8A mounts on the driven-unit-side portion 8B to be thereby outwardly displaced toward the rotation axis direction as shown in FIG. 9.

Here, the first-step protruding portion 9A slips out from the stepping portion 1C of the pulley 1 due to the displacement in the rotation axis direction. However, after the driving-unit-side portion 8A mounts on the driven-unit-side portion 8B, no further pushing force acts outwardly in the rotation axis direction. The cover 9 is thereby fixed to the pulley 1 by virtue of the second-step protruding portion 9B.

Consequently, without previously providing an additional clearance between the cover 9 and the pulley 1, the cover 9 is inhibited from slipping out from the pulley 1 when the bridging part 8 is broken. In other words, without making narrower a clearance between the cover 9 of the pulley 1 and other devices, the cover 9 restricts displacement of the damper 5 along with dispersion of the broken bridging part 8, the damper 5, or the like.

Here, a distance between the first-step and second-step protruding portions 9A, 9B in the rotation axis direction must be designed as being more than the maximum moving distance of the driving-unit-side portion 8A, i.e., a thickness of the bridging part 8 (or torque limiter).

(Second Embodiment)

Figure 7:
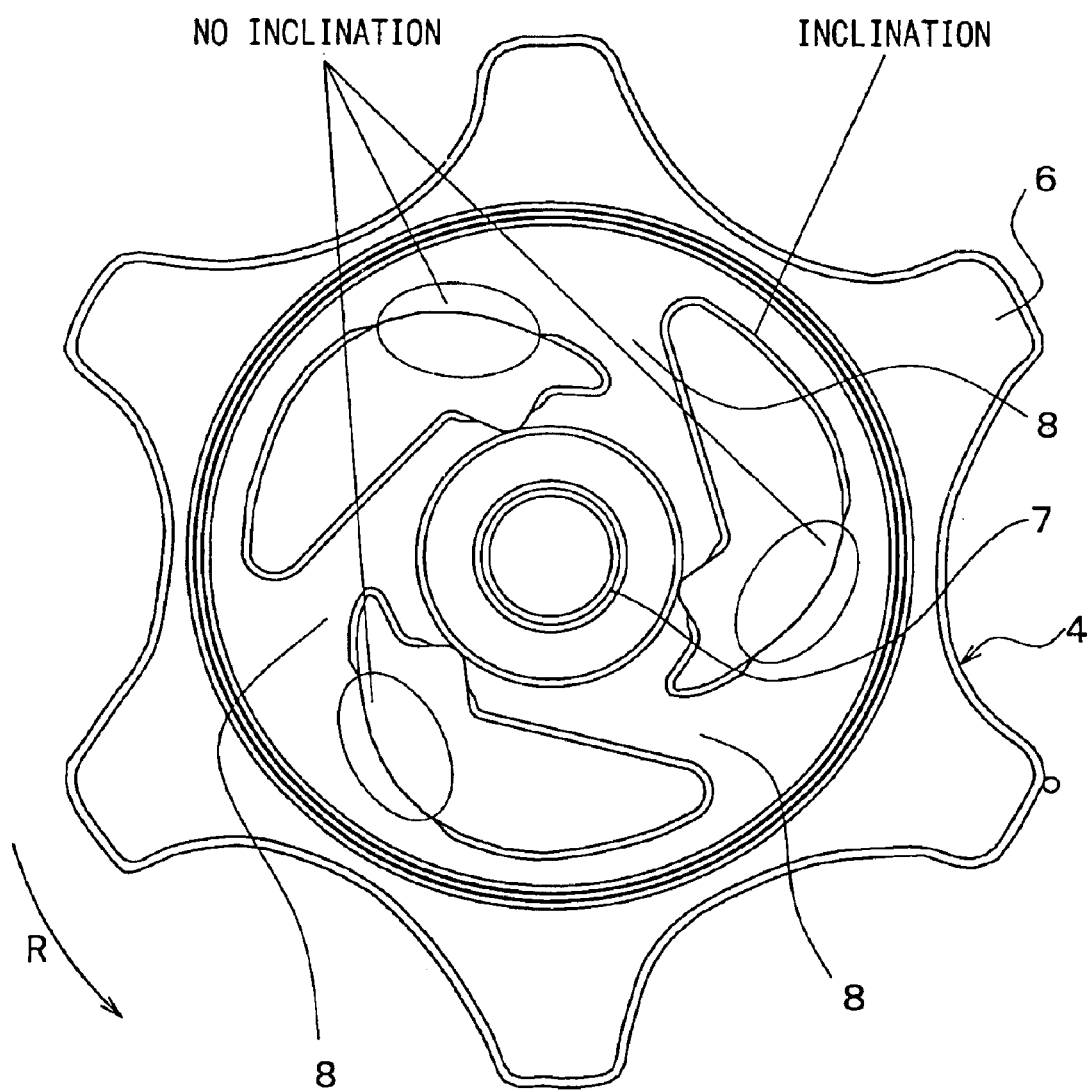
FIG. 7 is a front view of a center hub of a power transmission system according to a second embodiment.
Figure 10:
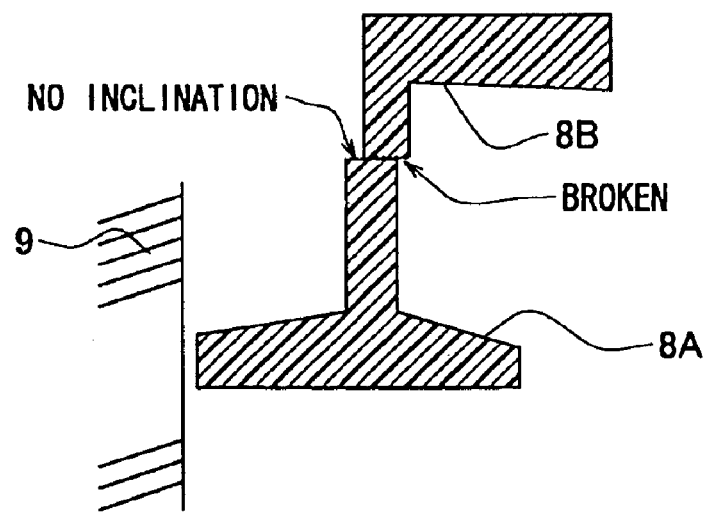
FIG. 10 is a schematic diagram explaining operational effect according to the second embodiment.

In a second embodiment of the present invention, given edge portions of the bridging parts 8 that are inside the ellipses in FIG. 7 have no inclination. Namely, each given edge portion is perpendicular to the rotation direction, while the other edge portions of the bridging parts 8 are inclined to the rotation direction, as shown in FIG. 7. The given edge portion is a region which the driven-unit-side portion 8B collides with. The given edge portion has no guiding surface that helps the driving-unit-portion 8A itself mount on the driven-unit-side portion 8B when the driven-unit-side portion 8B collides with the driving-unit-side portion 8A. This structure thereby inhibits the driving-unit-side portion 8A from mounting on the driven-unit-side portion 8B as shown in FIG. 10.

In this embodiment, edge portions other than the regions inside the ellipses in FIG. 7 are inclined so that releasing from a mold can be easily executed when the center hub 4 is drawn from the mold. However, if possible, all edge portions of the bridging parts 8 can be formed without inclination.

(Other Modification)

In the above embodiments, the oxygen-inhibiting layer of the damper 5 is formed of acrylic rubber. However, other materials such as phlorosilicon rubber, silicon rubber, fluorine rubber, polyamide, or poly-tetra-fluoro-ethylene can be used.

In the above embodiments, rubber such as EPDM (ethylene-propylene-diene ternary polymerization rubber) is used in an inward region from the oxygen-inhibiting layer. However, other resin material such as elastomer can be used.

In the above embodiments, the dampers 5 are elliptical cylinders. However, the dampers can be cylindrical or other-shaped.

In the above embodiments, the center hub 4, which is the second rotating member connected to a driven unit, is coaxially disposed inside the pulley 1, which is the first rotating member driven by a power source. However, the radial positions of the center hub 4 and the pulley 1 may be designed inversely.

In the above embodiments, the present invention is applied to a power transmission system transmitting the power generated by an engine to a compressor used in an air conditioning apparatus for a vehicle. However, the present invention is also applicable to other power transmission systems used in a fixed air conditioning apparatus or the like.

In the above embodiments, the first-step and second-step protruding portions 9A, 9B are aligned in parallel with the rotation axis direction. However, the first-step and second-step protruding portions 9A, 9B are aligned with having a given angle in the rotation direction.

Figure 2:
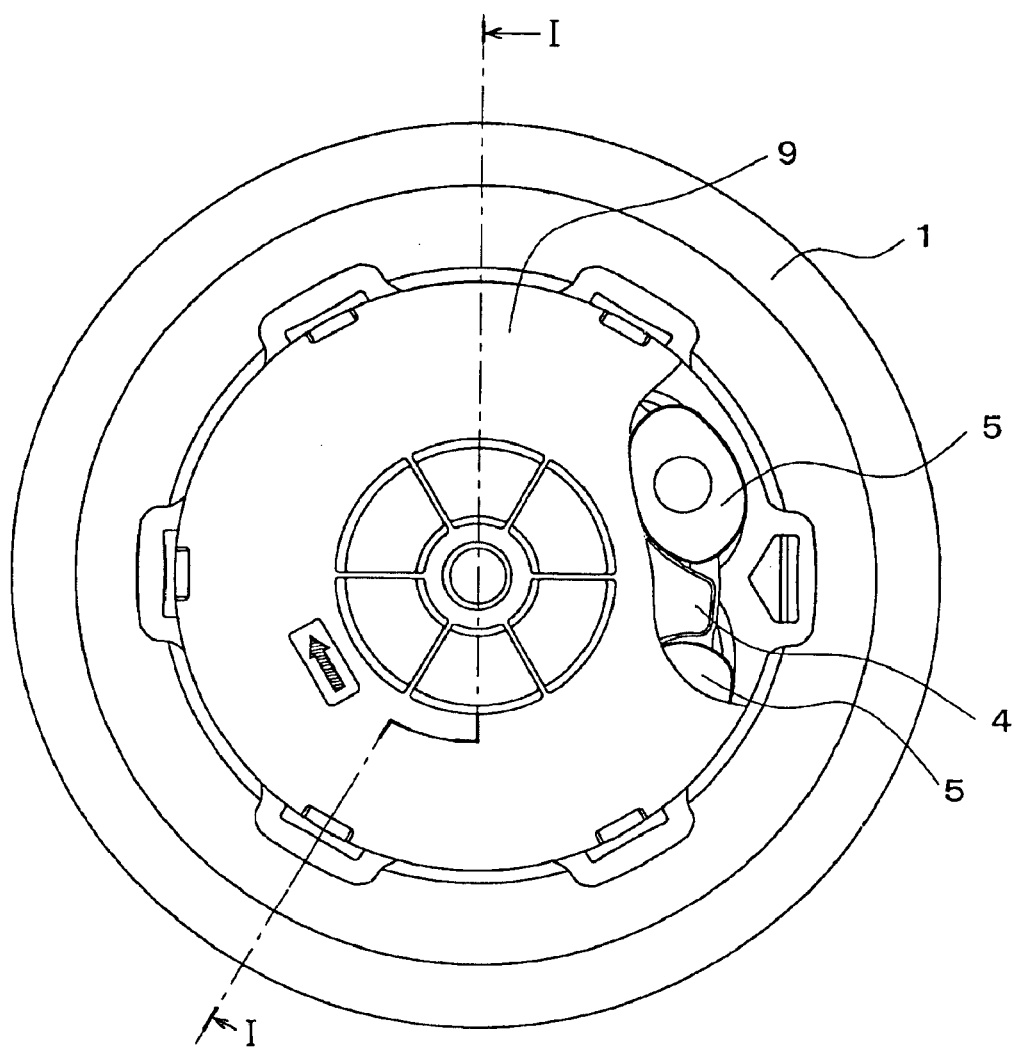
FIG. 2 is a left-side view of FIG. 1.

In detail, as shown in FIG. 2, a pair of the first-step and second-step protruding portions is aligned in the rotation axis direction, and the six pairs of the first-step and second-step protruding portions are disposed at 60-degree intervals in the rotation direction. However, the first-step protruding portion and the second-step protruding portion can be disposed with having a 30-degree difference in the rotation direction, and the six pairs of the first-step and second-step protruding portions are disposed at 60-degress intervals in the rotation direction.

In the above embodiments, the center hub 4 is formed of sintered metal. However, the center hub 4 can be formed of other material.

It will be obvious to those skilled in the art that various changes may be made in the above-described embodiments of the present invention. However, the scope of the present invention should be determined by the following claims.

What is claimed is:

1. A power transmission system for transmitting torque from a driving unit to a driven unit, the system comprising:
    a first rotating member rotated by the driving unit;
    a second rotating member connected to the driven unit;
    a torque limiter that transmits torque from the first rotating member to the second rotating member, wherein the torque limiter is partially broken to interrupt transmitting the torque when the torque transmitted to the driven unit exceeds a predetermined value;
    a damper that is formed of an elastically deformable member and disposed in a passage through which the torque between the first and the second rotating members is transmitted; and
    a cover that is hooked to be fixed with at least one of the first and the second rotating members to inhibit the damper from being displaced in a rotation axis direction of the first rotating member,
    wherein the cover includes a first-step protruding portion and a second-step protruding portion,
    wherein by using the first-step protruding portion the cover is hooked in a first state while by using the second-step protruding portion the cover is hooked in a second state, and
    wherein a clearance between the cover and the damper in the first state is narrower than a clearance between the cover and the damper in the second state.

2. The power transmission system according to claim 1, wherein the first-step and second-step protruding portions are integrated with the cover by using resin molding.

3. The power transmission system according to claim 1, wherein, after the torque limiter is partially broken, the torque limiter that is rotated around the rotation axis of the first rotating member collides, in a given edge region of the torque limiter, with a broken portion of the torque limiter, and
    wherein the given edge region of the torque limiter has a surface that is perpendicular to the rotating direction.

4. The power transmission system according to claim 3, wherein the torque limiter is formed by sintering metal powder.

* * * * *